United States Patent [19]
Nobumoto et al.

[11] Patent Number: 5,143,191
[45] Date of Patent: Sep. 1, 1992

[54] COUPLING FORCE CONTROL SYSTEM FOR FLUID COUPLING

[75] Inventors: Hidetoshi Nobumoto; Minzi Sakaki, both of Hiroshima, Japan

[73] Assignee: Mazda Motor Corporation, Hiroshima, Japan

[21] Appl. No.: 766,191

[22] Filed: Sep. 27, 1991

[30] Foreign Application Priority Data

Sep. 27, 1990 [JP] Japan .................. 2-261227

[51] Int. Cl.⁵ .............................. F16D 23/00
[52] U.S. Cl. ........................................ 192/76
[58] Field of Search ........................ 192/75, 76

[56] References Cited

U.S. PATENT DOCUMENTS

| | | | |
|---|---|---|---|
| 4,456,107 | 6/1984 | Ito et al. ........................... | 192/76 X |
| 4,580,671 | 4/1986 | Matsuoka et al. ................ | 192/76 |
| 4,588,059 | 5/1986 | Miki et al. ........................ | 192/76 X |
| 4,640,395 | 2/1987 | Murasurgi et al. ............... | 192/76 X |
| 4,687,083 | 8/1987 | Sotoyama et al. ................ | 192/76 |
| 4,706,790 | 11/1987 | Lockhart et al. ................. | 192/76 X |
| 4,760,761 | 8/1988 | Nishikawa et al. ............... | 192/76 X |
| 4,768,635 | 9/1988 | Sakurai et al. ................... | 192/76 |
| 5,085,301 | 2/1992 | Imamura et al. ................. | 192/76 |

FOREIGN PATENT DOCUMENTS 57-33253  2/1982  Japan .

Primary Examiner—Dirk Wright
Attorney, Agent, or Firm—Fleit, Jacobson, Cohn, Price, Holman & Stern

[57] ABSTRACT

A fluid coupling has a lockup mechanism, which is unlocked at an increased speed upon a large displacement of an accelerator pedal, and is provided with an activator for applying hydraulic pressure to the lockup mechanism to couple and uncouple the fluid coupling. The activator is controlled by a release controller so as to decrease graudally the hydraulic pressure at a predetermined rate. The fluid coupling is thus uncoupled with a gradual decrease of coupling force when an engine operates in a predetermined engine operating condition. The predetermined rate of pressure change is modified so as to advance uncoupling of the fluid coupling when an engine load is higher than a predetermined engine load, while the release controller controls the activator so as to decrease gradually the hydraulic pressure.

5 Claims, 5 Drawing Sheets

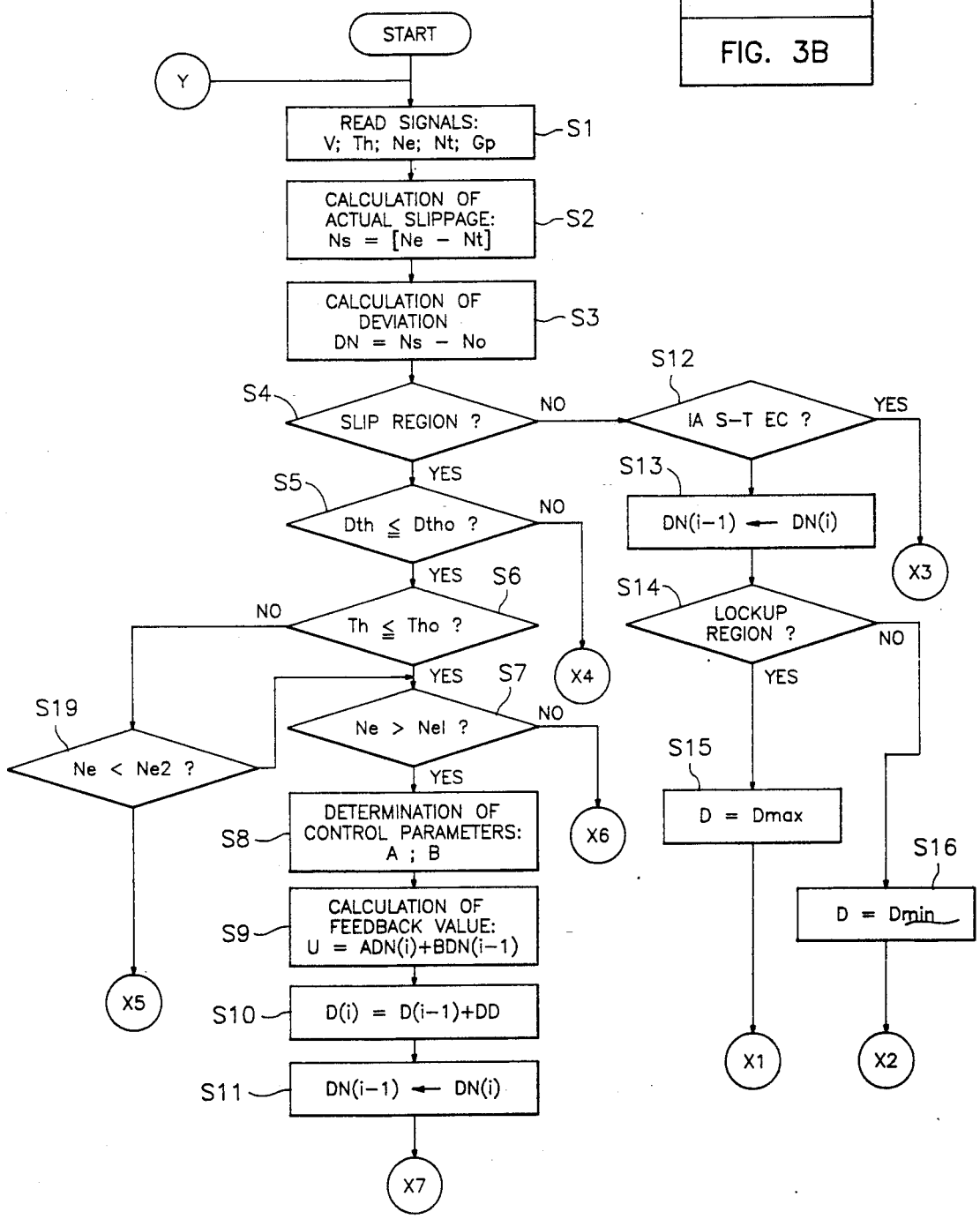

COUPLING FORCE CONTROL SYSTEM FOR FLUID COUPLING

The present invention relates to a coupling force control system for a fluid coupling with a lockup mechanism disposed between input and output elements.

BACKGROUND OF THE INVENTION

1. Field of the Invention

A coupling force control system for a fluid coupling equipped with a lockup mechanism, such as a torque convertor of an automatic transmission for an automotive vehicle, typically changes a coupling force to regulate slippage of the fluid coupling to a target amount in a predetermined region of engine operating conditions. The lockup mechanism provides the fluid coupling with an increase in coupling force when slippage, defined as the difference between rotational speeds transmitted to and from the fluid coupling, rises above a predetermined or target amount, and a decrease in coupling force when slippage falls below the predetermined or target amount.

2. Description of Related Art

A coupling force control system of the type referred to above is known from, for example, Japanese Unexamined Patent Publication No. 57-33,253. In such a system, when an accelerator pedal is depressed to release the lockup mechanism while the engine operates in a specific region of operating conditions, it is desirable not to instantaneously release the lockup mechanism, but rather to gradually lower the coupling force of the lockup mechanism at a constant rate so that the lockup mechanism allows slippage to increase gradually as it is uncoupled. Such a gradual increase of slippage in the lockup mechanism suppresses an abrupt increase in the rotational speed of the engine and helps to improve drive feeling.

Nevertheless, in the system mentioned above, in spite of a large displacement of the accelerator pedal, accompanied by an abrupt increase of drive torque, the lockup mechanism is unlocked with a gradual increase of slippage. Consequently, the frictional elements of the lockup mechanism are subjected to excessive wear, and the durability of the lockup mechanism is lowered.

SUMMARY OF THE INVENTION

It is, therefore, a primary object of the present invention to provide a fluid coupling with input and output shafts connected by a lockup mechanism which is uncoupled with a gradual reduction of coupling force.

It is another object of the present invention to provide a fluid coupling with its input and output shafts connected by a lockup mechanism which can be uncoupled at a speed suitably varied for improved durability.

These objects of the present invention are accomplished by providing a fluid coupling with a lockup mechanism which is unlocked at an increased speed upon a large displacement of the accelerator pedal. The fluid coupling is provided with an activation means for applying hydraulic pressure to the lockup mechanism to couple and uncouple the fluid coupling. The activation means is controlled, by release control means, so as to decrease gradually the hydraulic pressure at a predetermined rate. The fluid coupling is uncoupled with a gradual decrease in coupling force in a predetermined engine operating condition. The predetermined rate of pressure decrease is changed so as to advance the uncoupling of the fluid coupling when an engine load sensor detects engine loads higher than a predetermined engine load, while the release control means controls the activation means so as to gradually decrease the hydraulic pressure.

According to the fluid coupling of the present invention, because the coupling force of the lockup mechanism is gradually reduced at a predetermined rate of change when the lockup mechanism is released to unlock the fluid coupling, an abrupt increase in engine speed, arising from the release of the lockup mechanism, is prevented. Moreover, when the accelerator pedal is depressed heavily and, as a result, the engine load is suddenly increased, because the reduction of the coupling force becomes more rapid, the speed at which the lockup mechanism is released is hastened, so that wear of the friction elements of the lockup mechanism is effectively suppressed. Durability of the elements is, therefore, maintained.

BRIEF DESCRIPTION OF THE DRAWINGS

The above and other objects and features of the present invention will be apparent to those skilled in the art from the following description, which is directed to a preferred embodiment of the invention, when considered in conjunction with the appended drawings, in which.

DETAILED DESCRIPTION OF THE PREFERRED EMBODIMENT

Figure 1:
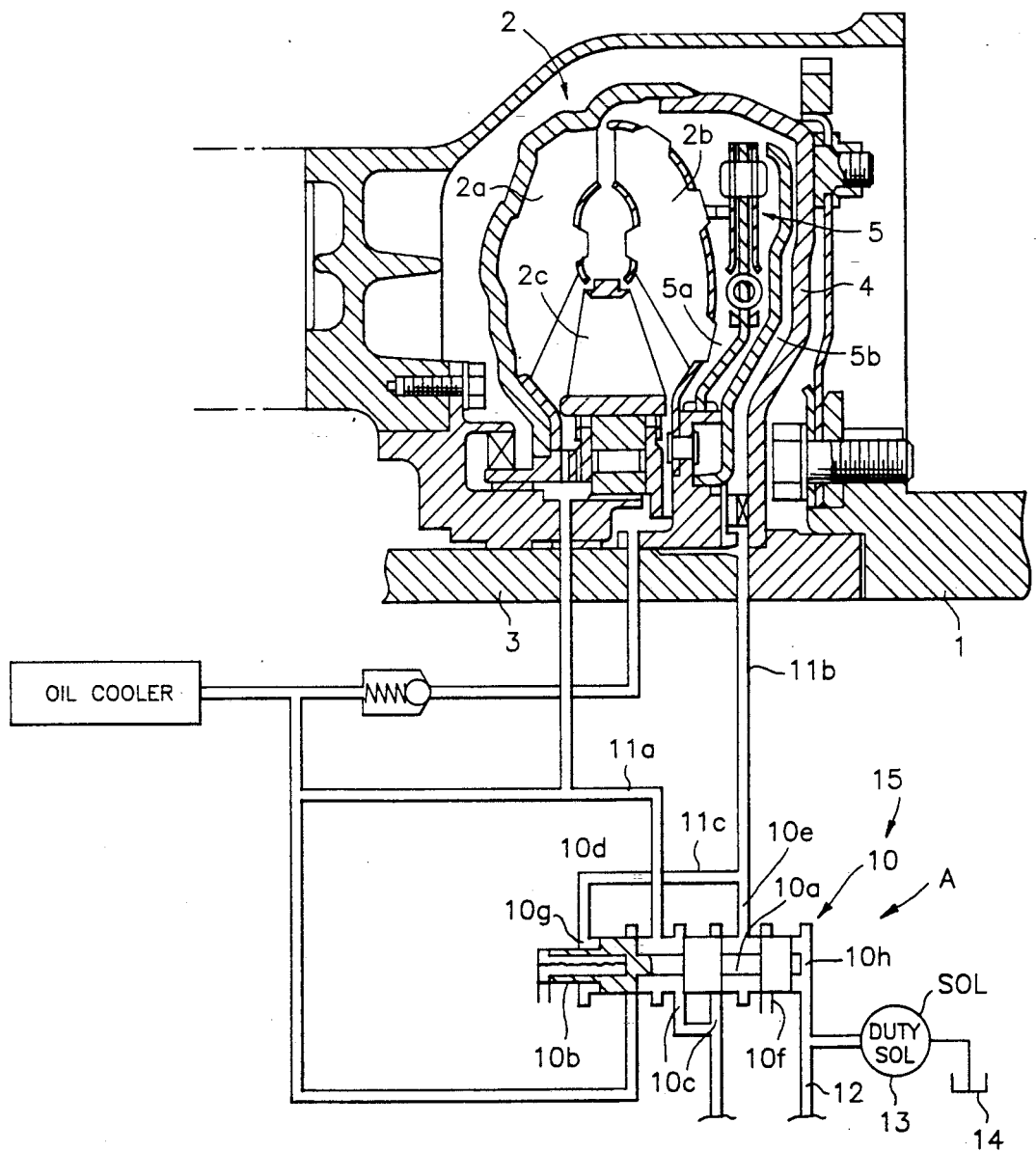
FIG. 1 is an illustration showing a hydraulic pressure circuit for controlling hydraulic pressure applied to a fluid coupling, having a lockup clutch, so as to change the coupling force of the fluid coupling.

Referring to the drawings in detail and, in particular, to FIG. 1, a fluid coupling, such as a torque converter 2, with a lockup mechanism for an automotive automatic transmission, is shown. The fluid coupling includes a pump 2a, a turbine 2b and a stator 2c. The pump and turbine 2a and 2b are, respectively, fastened to such shafts as an engine crankshaft or engine output shaft 1 and a transmission shaft 3 of a transmission. The transmission may be, for example, a four speed automatic transmission (not shown). The pump and turbine 2a and 2b are placed face to face with a slight clearance between them. The stator 2c, which performs torque amplification, is located between the pump 2a and turbine 2b.

The torque converter 2 is provided with a lockup clutch 5 forming a lockup mechanism between the turbine 2b and a housing or converter case 4. When the lockup clutch 5 is activated, the pump 2a and turbine 2b, and hence the engine output shaft 1 and transmission shaft 3, are mechanically connected or locked together. The lockup clutch 5 is urged alternatively in the lockup direction (to the right as viewed in FIG. 1), by hydraulic pressure introduced in its lockup pressure chamber 5a on a side of the turbine 2b, and in the non-lockup direction (to the left), by hydraulic pressure introduced in its release pressure chamber 5b on a side of the housing. The lockup clutch 5 is activated by a hydraulic pressure control circuit A.

In the hydraulic pressure control circuit A is a lockup control valve 10 for governing or controlling the supply of oil to the lockup clutch 5. The lockup control valve 10 is provided with a spool 10a and a spring 10b for urging the spool 10a to the right as viewed in FIG. 1. The lockup control valve 10 has a line pressure inlet port 10c, through which the line pressure is introduced into the lockup control valve 10, and a release pressure outlet port 10d connected to the lockup pressure chamber 5a of the lockup clutch 5. These inlet and outlet ports 10c and 10d are brought into communication with each other when the lockup control valve 10 forces the spool 10a to the right so as to allow the line pressure to be applied into the lockup pressure chamber 5a through a lockup pressure line 11a. The lockup control valve 10 further has a lockup pressure outlet port 10e and a tank port 10f. The lockup pressure outlet port 10e is in communication with the release pressure chamber 5b of the lockup clutch 5 through a release pressure line 11b and with a pressure chamber 10g through a branch pressure line 11c branching off from the release pressure line 11b. The hydraulic pressure P1 at the lockup pressure outlet port 10e acts on the spool 10a at the left-hand end via the branch pressure passage 11c. The pilot pressure chamber 10g is in communication with an oil tank 14 via a pilot pressure line 12, having a duty solenoid valve 13 disposed therein. The duty solenoid valve 13 opens and closes the pilot pressure line 12.

The duty solenoid valve 13 keeps the pilot pressure line 12 open when it is operated at a duty rate D of 100% and closed when it is operated at a duty rate D of 0%. As is well known, changing the duty rate D of the duty solenoid valve 13 causes a change in fluid flow from the pilot pressure line 12 to the tank 14 so as to regulate the pilot pressure Po applied to the lockup control valve 10. According to the difference between pressures acting on the opposite ends of the spool 10a produced by the hydraulic pressure P1 at the lockup pressure outlet port 10e, the pressure SP1 applied by the spring 10b, and the pilot pressure Po at the pilot pressure port 10h, the lockup control valve 10 allows the spool 10a to move reciprocally to the right and left so as to bring the lockup pressure outlet port 10e alternatively into communication with the line pressure inlet port 10c and the tank port 10f. In this way, the hydraulic pressure P1 developed at the lockup pressure outlet port 10e, which acts as a release pressure on the lockup clutch 5, is regulated corresponding to the pilot pressure Po in the pilot pressure line 12. The coupling force of the lockup clutch 5 is proportional to the hydraulic pressure P1 developed at the lockup pressure outlet port 10e.

Accordingly, when duty solenoid valve 13 operates, at a duty rate of 100%, to fully open the pilot pressure line 12, the lockup control valve 10 shuts off the communication between the line pressure inlet port 10c and the lockup pressure outlet port 10e so that no hydraulic pressure is applied into the release pressure chamber 5b of the lockup clutch 5. The lockup clutch 5 is, therefore, completely coupled with a maximum coupling force. With a gradual reduction of the duty rate D, the lockup control valve 5 correspondingly develops hydraulic pressure in the release pressure line 11b and decreases hydraulic pressure in the lockup pressure line 11a. When the duty rate D is changed to 0%, the lockup clutch 5 is completely uncoupled.

Figure 2:
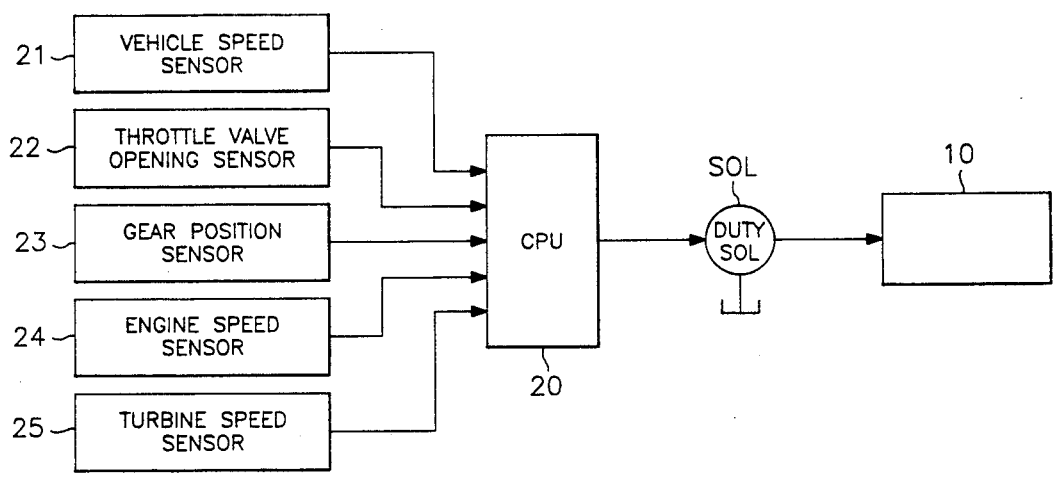
FIG. 2 is a block diagram of a control system for the fluid coupling.

Referring to FIG. 2, an electrical control unit, for controlling the duty rate D of the duty solenoid valve 13 so as to control the lockup control valve 10, is shown. The coupling force of the lockup clutch 5 is varied by the electrical control unit as the duty rate D is changed. The control unit, which includes a central processing unit (CPU) 20, receives various signals, such as those representative of vehicle speed V, throttle opening Th, transmission gear position Gp, engine speed Ne, and turbine speed Nt. Such signals are generated by a vehicle speed sensor 21, a throttle opening sensor 22, a transmission gear position sensor 23, an engine speed sensor 24, and a turbine speed sensor 25, respectively. All of these sensors are well known to those skilled in the art and, accordingly, are not described.

Figure 3B:
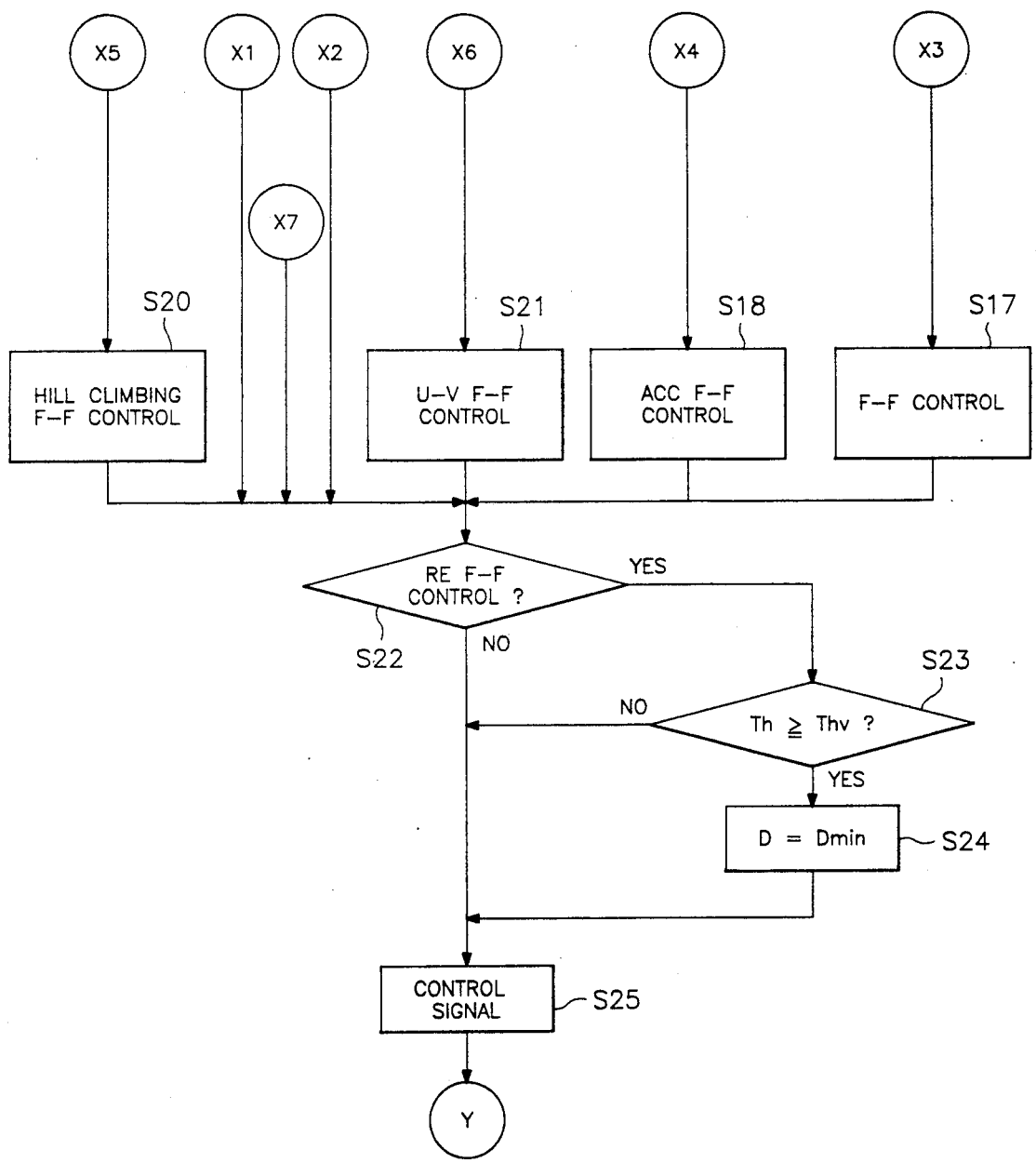
FIG. 3 is a flow chart illustrating a coupling force control sequence.

The operation of the lockup clutch 5 depicted in FIG. 1 is best understood by reviewing FIG. 3, which is a flow chart illustrating a coupling force control routine.

After starting the coupling force control routine, various signals are read at step S1 to determine a vehicle speed V, a throttle opening Th, a transmission gear position Gp, an engine speed Ne and a turbine speed Nt. The difference between the engine speed Ne and the turbine speed Nt is calculated at step S2 in order to determine actual slippage Ns caused between the input and output shafts of the torque converter 2. In addition, another calculation is made at step S3 to determine the deviation DN of the actual slippage Ns from a target slippage No. After these calculations are performed, a decision is made at step S4, based on the vehicle speed V and throttle valve opening Th, whether the engine operates within a slip control region shown in FIG. 4. If the answer to the decision made in step S4 is yes, the engine is operating within the slip control region. Then, further decisions are made, at steps S5, S6 and S7, regarding the rate of change DTh of the throttle opening Th, the throttle opening Th itself and the engine speed Ne, respectively. When the rate of change DTh of the throttle opening Th is smaller than a predetermined rate DTho, it is decided that there is no demand for acceleration of the vehicle. When the throttle opening Th is smaller than a predetermined opening Tho and the engine speed is larger than a predetermined engine speed Ne1, it is judged that the vehicle is not moving down a slope. It is to be noted that the predetermined speed Ne1 and the predetermined throttle opening Tho are upper critical values for defining what is considered to be a low speed engine operating zone. If the answers to all the decisions made in steps S5, S6 and S7 are yes, a control is made to cause the coupling force of the lockup clutch 5 to approach a target coupling force value. For the coupling force control, control parameters A and B, necessary for calculation of a feedback control slippage for slip control, are determined at step S8. The control parameters are determined based on experience, and depend on characteristics, such as size, of the engine. Then, the feedback control value U for slippage is calculated, based on the deviations DN(i) and DN(i−1) of the actual slippage Ns(1) and Ns(i−1), from the target slippage No for the present and previous sequence cycles (i) and (i−1), respectively, and the control parameters A and B at step S9. Specifically, the feedback control value U is calculated from the following equation:

$$U = A \times DN(i) + B \times DN(i-1)$$

Thereafter, the duty rate correction value DD is retrieved from a duty rate correction map (not shown) defined relative to feedback control value U for slippage. The duty rate correction value is used to determine a duty rate $D(i)$ for the present sequence cycle by correcting a duty rate $D(i-1)$ for the previous sequence cycle with the duty rate correction value DD at step S10. At step S11, the previous slippage deviation $DN(i-1)$ is replaced by the present slippage deviation $DN(i)$.

Figure 4:
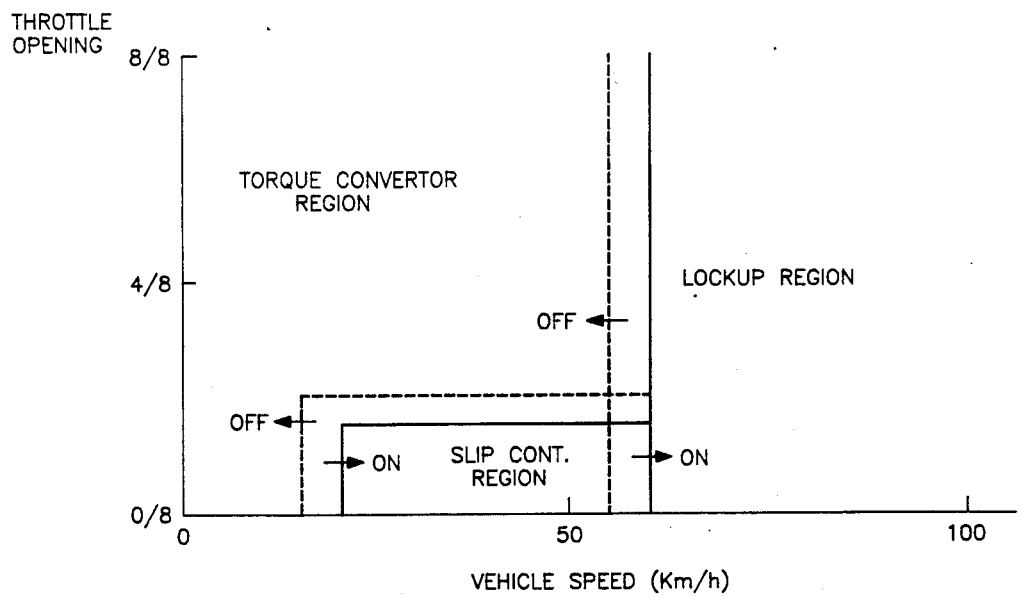
FIG. 4 is a diagram showing a slip control region of engine operating condition.

If the answer to the decision made at step S4 regarding the slip control region is no, this indicates that the engine operating condition is within a lockup region or a torque converter control region shown in FIG. 4. Then, a decision is made at step S12 as to whether a transition of the engine operating condition (IA S-T EC) from the slip control region to the torque converter control region has just occurred. If the answer to the decision made at step S12 is no, the previous slippage deviation $DN(i-1)$ is replaced with the present slippage deviation $DN(i)$ at step S13. A decision is made at step S14 as to whether or not the engine operating condition is within a lockup region. The duty rate D is set to its maximum rate Dmax at step S16 when the engine operating condition is within the lockup region so as to completely activate the lockup clutch 5. Otherwise, the duty rate is set to its minimum rate Dmin at step S16 when the engine operating condition is out of the lockup region so as to completely release or uncouple the lockup clutch 5.

If the answer to the decision made at step S12 is yes, this indicates that a transition of the engine operating condition from the slip control region to the torque converter control region has just occurred Then, the duty rate D is changed stepwise by decrements, at a predetermined change rate DDf, to the minimum rate Dmin at step S17 for feedforward control so as to bring the lockup clutch 5 into complete uncoupling.

Figure 5:
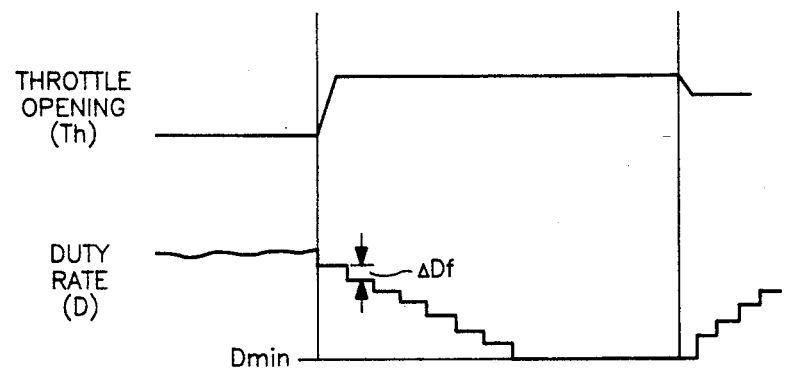
FIG. 5 is an explanatory diagram of changing a duty rate for acceleration.
Figure 6:
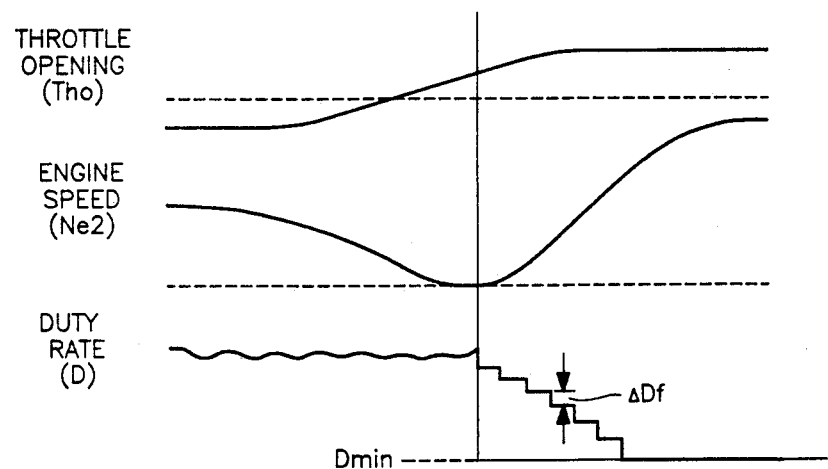
FIG. 6 is an explanatory diagram of changing a duty rate for hill climbing.

If the answer to the decision regarding the rate of change DTh of the throttle opening made at step S5 is no, this indicates that there is a demand for acceleration. Then, the duty rate D is changed stepwise by decrements, at the predetermined change rate DDf, to the minimum rate Dmin at step S18 for acceleration feedforward control so as to completely uncouple the lockup clutch 5. When the throttle opening Th is smaller than the predetermined opening Tho and the engine speed Ne is smaller than the predetermined speed Ne1, the duty rate D is changed stepwise by decrements, at the predetermined change rate DDf, to the minimum rate Dmin at step S21 for anti-vibration (U-V) feedforward control. The lockup clutch 5 is thus brought into complete uncoupling. This U-V feedforward control is executed to suppress vibrations during low speed engine operation. However, if the throttle opening Th is larger than the predetermined opening Tho, another decision is made at step S19 as to whether the engine speed Ne is lower than a predetermined speed Ne2. It is to be noted that the predetermined speed Ne2 is higher than the predetermined speed Ne1 and is considered to be the upper critical engine speed for defining a hill climbing engine operating zone. This zone is defined when the throttle opening Th is greater than the upper critical throttle opening Tho. If the answer to the decision made at step S19 is yes, this indicates that the vehicle is traveling or climbing uphill. Then, the duty rate D is changed stepwise by decrements, at the predetermined change rate DDf, to the minimum rate Dmin at step S20 for uphill travel feedforward control so as to completely uncouple the lockup clutch 5. Otherwise, if the answer to the decision at step S19 is no, the decision regarding the predetermined speed Ne1 is made at step S7. In any feedforward control, the decrement of the predetermined change rate DDf is performed as is shown in FIG. 5.

Figure 7:
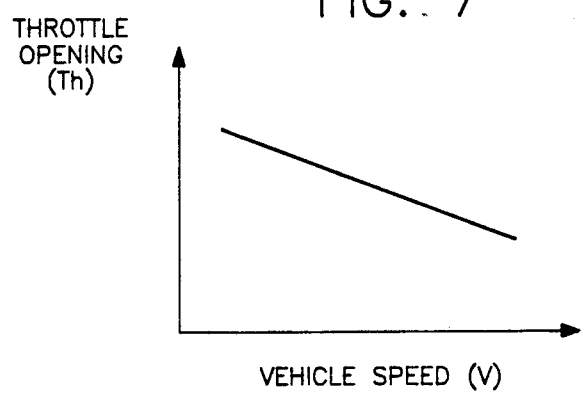
FIG. 7 is a graph showing the opening characteristics of the throttle valve as a function of vehicle speed.

After any of the steps S11, S15, S16, S17, S18, S20 or S21, a decision is made at step S22 as to whether any feedforward control takes place to change the duty rate D stepwise by decrements, at the predetermined change rate DDf, for gradually releasing or uncoupling the lockup clutch 5. If the answer to the decision is yes, a final decision is made at step S23 as to whether the throttle opening Th is larger than a specific throttle opening Thv, which varies according to the vehicle speed V as is shown in FIG. 7. The specific throttle opening Thv, used for the determination of engine load, is made smaller as the vehicle speed V becomes higher. If the answer to the decision is yes, this indicates that the engine is operating under higher loads. Then, the duty rate D is immediately changed to a minimum rate Dmin at step S24 so as to completely release or uncouple the lockup clutch 5. Finally, after establishing the duty rate D in the above described manner, a drive signal is provided to drive the duty solenoid valve 13 at the established duty rate D at S25. The final step orders return to the first step at step S1.

As is apparent from the above, when the engine is subjected to an acceleration demand, when the vehicle travels uphill, or when the engine is subjected to a low load and low speed operation, the lockup clutch is released by gradually reducing the coupling force. Such a coupling force reduction is accomplished by changing the duty rate D by decrements at the predetermined rate DDf of change. Furthermore, when the throttle opening sensor 22 detects throttle openings Th which are greater than the predetermined opening Thv, indicating higher engine loads, during the reduction of the coupling force of the lockup clutch 5, the duty rate D is immediately changed to the minimum rate Dmin. The lockup clutch 5, therefore, is instantaneously and completely released.

Accordingly, the lockup clutch 5 is released or uncoupled when the engine operating condition is within a region in which torque multiplication is required in the torque converter 2. In other words, the lockup clutch is released immediately after the transition of an engine operating condition from the slip control region to the converter region, when the engine is under acceleration during which the change rate DTh of the throttle opening is greater than the predetermined rate DTho, when the vehicle travels uphill, when the throttle opening Th is greater than the predetermined throttle opening Tho and the engine speed Ne is higher than the predetermined speed Ne2, and when the engine operating condition enters into a region in which vehicle vibrations are easily caused, wherein the throttle opening Th is smaller than the predetermined throttle opening Tho and the engine speed Ne is lower than the predetermined speed Ne2. In these engine operating conditions, the coupling force of the lockup clutch 5 is gradually reduced, corresponding to stepwise changes by decrements at the predetermined rate DDf. Consequently, the engine speed is changed smoothly and does not undergo an abrupt increase.

Moreover, even when a reducing control of the coupling force, as described above, is present, when the throttle opening Th of the throttle valve is made larger than a specific throttle opening Thv, corresponding to a vehicle speed V, due to a large depression of the accelerator pedal, the duty rate D is immediately changed to the minimum rate Dmin. The lockup clutch 5 is thus instantaneously and completely released or uncoupled. This prevents the friction elements of the lockup clutch 5 from being subjected to abrasion for a long time and, therefore, improves the durability of the lockup clutch 5.

It is to be noted that although the duty rate D is immediately changed to the minimum rate Dmin when the engine operates in a specific region of higher loads, defined by throttle openings Th which have greater than the specific throttle openings Thv according to vehicle speeds V, the change rate DDf of duty rate DDD is greater in the high load region than in the regions wherein a reducing control of the coupling force is performed.

By means of the fluid coupling force control system of the present invention, releasing of the lockup mechanism is performed gradually. An abrupt increase of engine speed is, therefore, prevented when the lockup mechanism is released, so as to provide an improvement in the feel of operation. In addition, when engine load is suddenly increased, etc., as the lockup mechanism is gradually released, its speed of release is hastened, suppressing wear, so that the durability of the lockup mechanism is improved. Thus, an improvement in operating feeling is provided, and the durability of the lockup mechanism is maintained.

It is to be understood that although the present invention has been described with respect to a preferred embodiment thereof, various other embodiments and variants, which fall within the scope and spirit of the invention, may be possible. Such other embodiments and variants are intended to be covered by the following claims.

What is claimed is:

1. A coupling control system for a fluid coupling with a hydraulically operated lockup mechanism for use with an automotive engine comprising:
   sensor means for detecting engine operating conditions of the automotive engine;
   activation means for applying hydraulic pressure to the lockup mechanism to couple and uncouple the fluid coupling;
   release control means for controlling said activation means to decrease gradually the hydraulic pressure at a predetermined rate so as to uncouple the fluid coupling with a gradually decreasing coupling force in a predetermined engine operating condition; and
   rate changing means for changing said predetermined rate so as to advance uncoupling of the fluid coupling when said sensor means detects engine loads higher than a predetermined engine load while said release control means controls said activation means to gradually decrease the hydraulic pressure.

2. A coupling control system as recited in claim 1, wherein said rate changing means changes said predetermined rate immediately after said sensor means detects a transition of an engine operating condition to a convertor region.

3. A coupling control system as recited in claim 1, wherein said rate changing means changes said predetermined rate when said sensor means detects a throttle opening change rate greater than a predetermined throttle opening change rate.

4. A coupling control system as recited in claim 1, wherein said rate changing means changes said predetermined rate when said sensor means detects a throttle opening smaller than a predetermined throttle opening and an engine speed lower than a first predetermined engine speed.

5. A coupling control system as recited in claim 4, wherein said rate changing means changes said predetermined rate when said sensor means detects a throttle opening greater than said predetermined throttle opening and an engine speed lower than a second predetermined engine speed higher than said first predetermined engine speed.

* * * * *